United States Patent
McConnell

(10) Patent No.: US 6,202,545 B1
(45) Date of Patent: Mar. 20, 2001

(54) STAGED ROTISSERIE

(76) Inventor: James W. McConnell, 1240 NW. 55th St., Gainesville, FL (US) 32605

( * ) Notice: Subject to any disclaimer, the term of this patent is extended or adjusted under 35 U.S.C. 154(b) by 0 days.

(21) Appl. No.: 09/432,837

(22) Filed: Nov. 1, 1999

Related U.S. Application Data

(63) Continuation of application No. 09/092,787, filed on Jun. 5, 1998, now Pat. No. 5,974,956.

(51) Int. Cl.[7] ......................... A47J 37/04
(52) U.S. Cl. ............ 99/421 H; 99/420; 99/433 R
(58) Field of Search ............... 99/420, 421 H, 99/421 R, 443 R, 443 C; 426/523, 520

(56) References Cited

U.S. PATENT DOCUMENTS

| | | | |
|---|---|---|---|
| 1,996,297 | 4/1935 | Langenfeld | 99/419 |
| 2,138,813 | 12/1938 | Bemis | 99/420 |
| 2,142,390 | 1/1939 | Zerr | 99/420 |
| 2,520,067 | 8/1950 | Sagen | 99/420 |
| 2,556,808 | 6/1951 | Harris | 99/420 |
| 2,655,096 | 10/1953 | Ebin | 99/420 |
| 3,338,156 | 8/1967 | Angelos | 99/420 |
| 3,734,740 | 5/1973 | Zenos | 99/443 C |
| 3,747,510 | 7/1973 | Gladd et al. | 99/443 C |
| 3,848,523 | 11/1974 | Galisz et al. | 99/421 H |
| 4,034,661 | 7/1977 | Boosalis et al. | 99/420 X |
| 4,366,182 | 12/1982 | Kohler | 99/326 |
| 4,440,071 | 4/1984 | Boosalis | 99/339 |
| 4,644,857 | 2/1987 | Buller-Colthurst | 99/335 |
| 4,760,776 | 8/1988 | Beidler | 99/421 H |
| 4,882,985 | 11/1989 | Beller | 99/426 |
| 5,133,447 | 7/1992 | Florindez | 99/353 |
| 5,146,842 | 9/1992 | Romano | 99/421 V |
| 5,197,375 | 3/1993 | Rosenbrock et al. | 99/328 |
| 5,377,582 | 1/1995 | Nersesian | 99/420 |
| 5,460,080 | 10/1995 | Maru, Jr. | 99/420 |
| 5,471,915 | 12/1995 | Lopata | 99/421 H |
| 5,476,035 | 12/1995 | Florindez | 99/443 C |
| 5,542,345 | 8/1996 | Gongwer | 99/345 |
| 5,740,722 | 4/1998 | Emsens | 99/421 H X |

*Primary Examiner*—Reginald L. Alexander
(74) *Attorney, Agent, or Firm*—Garner Groff Mehrman & Josephic, P.C.

(57) ABSTRACT

A staged rotisserie for cooking poultry includes a housing having an inlet end and an outlet end and a plurality of discrete heating stations spaced within the housing between the inlet end and the outlet end. A plurality of poultry spits are moved through the housing, each spit supporting a poultry thereon. An admission mechanism is provided for controlling admission of spits into the housing. An advancement and driving mechanism advances the spits through the housing in sequential fashion and drives the spits in rotation within the housing, and is operative to ensure that each spit resides within the housing for a pre-determined length of time to ensure that the poultry is properly cooked, thereby avoiding undercooking and overcooking.

18 Claims, 3 Drawing Sheets

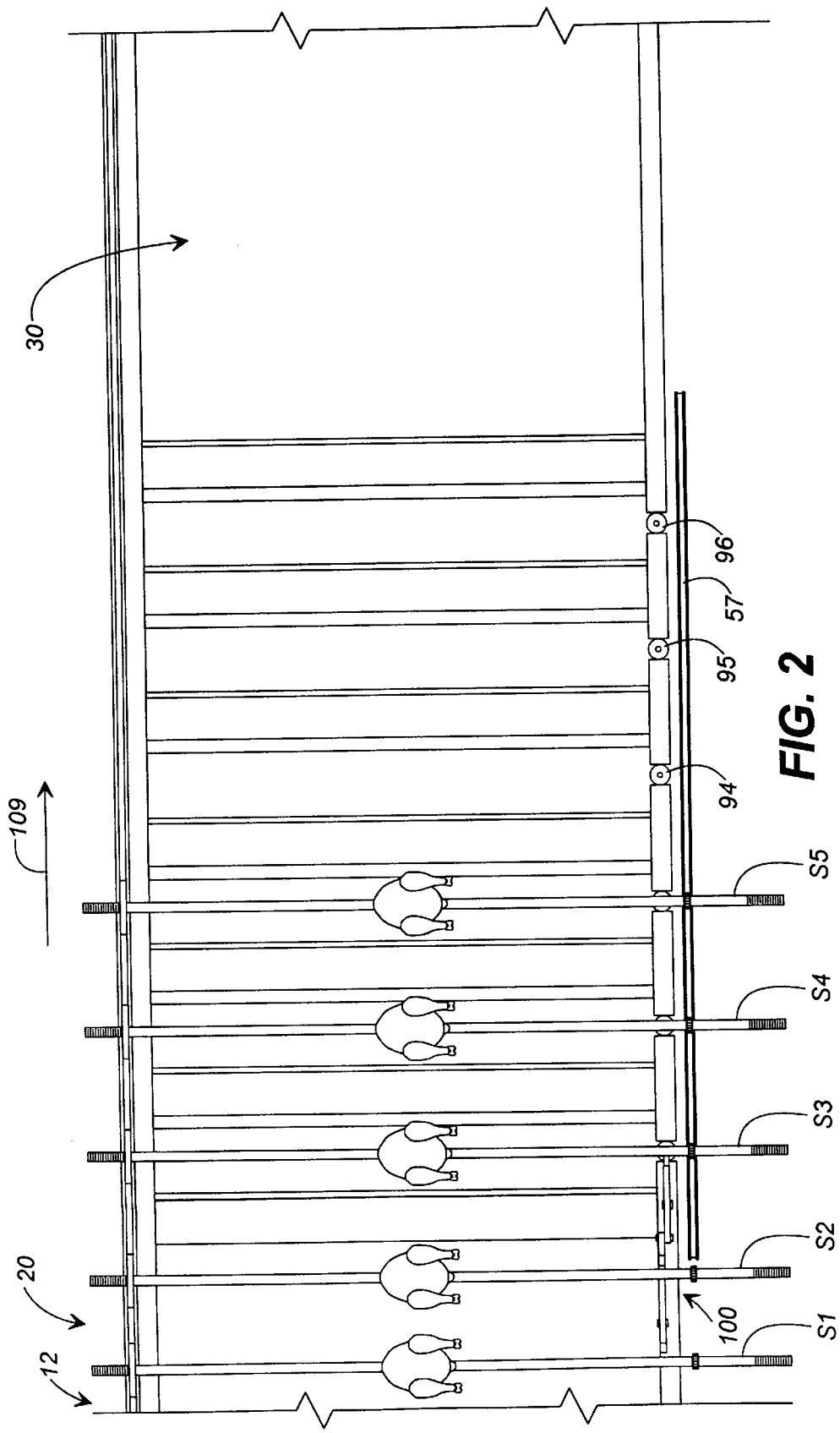

STAGED ROTISSERIE

This application is a continuation Ser. No. 09/092,787 filed Jun. 5, 1998, now U.S. Pat. No. 5,974,956.

TECHNICAL FIELD

The present invention relates generally to commercial cooking apparatus and in particular relates to a staged rotisserie for cooking meat products, such as poultry.

BACKGROUND OF THE INVENTION

In the general field of industrial cooking and baking, there are numerous processes and techniques that are employed. For example, it is known to process some products using batch cooking operations in which a number of products are placed in an oven, cooked for a time, and then removed, after which a subsequent batch of products is placed in the oven for cooking and the process repeats.

It is also known in industrial food processing and cooking to process foods as they are moved along a conveyor line in a rather continuous fashion. For example, cookies are often cooked this way by placing raw cookie dough on a conveyor and conveying the cookie dough through an oven chamber at a predetermined speed to have the cookie dough resident in the oven chamber for a predetermined length of time in order to bake the cookies adequately. This results in baked cookies exiting the downstream end of the oven ready for packaging.

U.S. Pat. No. 4,644,857 of Buller-Colthurst relates to a food processing chamber and technique for the processing of meat and poultry products in the processed meat trade. The '857 patent describes that a process chamber is operated in a batch mode such that a batch of products can be introduced into a zone and then simply left stationary during its processing time in that zone. Once that time is up, the batch then can be moved to the next zone and simply left to stand in the next zone and so on. The '857 patent further describes that in order to move batches or units of products through the zones, a step-wise or batch conveyor system is provided.

In the common manner of cooking chicken or other poultry in a restaurant, a rotisserie is used in which poultry are placed on skewers or spits and the spits are placed within a small oven. The individual spits are rotated about their axis and the group of spits revolve around a central axis to provide even cooking of all of the poultry in the rotisserie. Such a system is shown generally in U.S. Pat. No. 5,471,915 of Lopata. Unfortunately, such a system generally fails to control the residence time of each individual poultry item. Indeed, unless all the poultry items are placed in the rotisserie at the same time and later removed all at once, some poultry items can be cooked for too long, other poultry items can be cooked just the right length of time, while still other poultry items can be cooked not long enough. This is very important inasmuch as even slight undercooking of poultry can pose a serious health risk to consumers by virtue of a failure to completely kill all bacteria that might be present on or in the poultry. Moreover, even slight overcooking of the poultry is highly undesirable as it tends to make the poultry rather tough and dry (poultry seems to be particularly sensitive to overcooking).

Accordingly, it can be seen that a need yet remains for a rotisserie for cooking food items such as poultry, which rotisserie ensures precise control over the cooking of the meat therein to ensure proper doneness of the meat. It is to the provision of such a rotisserie that the present invention is primarily directed.

SUMMARY OF THE INVENTION

Briefly described, in a first preferred form the present invention comprises a staged rotisserie for the controlled cooking of meat, such as poultry. The novel staged rotisserie includes a frame or a housing having an inlet end and an outlet end and has a plurality of discrete heating stations arranged sequentially from the inlet end to the outlet end. The staged rotisserie further includes a number of spits for supporting meat products mounted thereon and support means for supporting the spits in the plurality of discrete heating stations. Further, driving means are provided for driving the spits in rotation and advancement means are provided for periodically advancing the spits from one of the discrete heating stations to a sequentially next one of the discrete heating stations.

Preferably, as spits move toward the outlet end, the spits are continuously rotated by the driving means. Also preferably, the driving means are in the form of an endless drive chain driven continuously and engaging sprockets mounted on the spits. Also preferably, the staged rotisserie includes an inlet control means for controlling admission of the spits adjacent the inlet end of the housing and being operative to admit a leading spit from a queue of spits adjacent the inlet end. Preferably, the inlet control means is activated by operation of the advancement means so that as the spits are advanced, another spit can be admitted through the inlet end.

Preferably, the progression of the spits through the plurality of discrete heating stations is generally in a descending manner and the advancement means is operable to lift the spits from a lowered cooking position to a raised advancement position from which the spits can descend by gravity to the next sequential discrete heating station. Preferably, the advancement means takes the form of a series of lifters, each being operative for lifting a spit, and a cam bar for raising and lowering the lifters. Also preferably, guides are positioned at each of the discrete heating stations to guide movement of the spits from the lowered cooking position to the raised advancement position.

The invention just described has numerous advantages. For example, the invention eliminates the requirement of an operator to monitor the time that a bird spends in a cooking apparatus or to monitor the internal temperature of the meat. In this way, human error is avoided. Moreover, the invention provides an extremely uniformly cooked product and does so at relatively high volumes (large numbers of poultry can be cooked in this way). The staged rotisserie apparatus also takes up a relatively small amount of space relative to its output of poultry. The staged rotisserie has the ability to vary the cooking temperature at various stages of cooking to effect optimum cooking results. Also, the staged rotisserie is designed to minimize cooking flare-ups and preferably includes side windows and top windows to allow operators and customers to view the cooking birds directly to verify the quality of the cooking period. Importantly, by eliminating the human element in timing the cooking operation or in monitoring an internal cooking temperature in the meat, overcooked and undercooked chicken can be virtually eliminated. The apparatus, because it requires less monitoring, also increases throughput while reducing the number of personnel required to operate the equipment.

Accordingly, it is an object of the present invention to provide a rotisserie which reliably cooks poultry to a precise degree of doneness.

It is another object of the present invention to provide a rotisserie which eliminates the need to have an operator monitor how long the item is being cooked or the final temperature of the item being cooked.

It is another object of the present invention to provide a rotisserie which allows the cooking temperature at various stages of cooking to be varied.

It is another object of the present invention to provide a rotisserie which minimizes flame flare-ups.

It is another object of the present invention to provide a rotisserie which is capable of producing extremely high volumes of uniformly cooked poultry.

It is another object of the present invention to provide a poultry rotisserie requiring a minimum amount of floor space.

It is another object of the present invention to provide a rotisserie. which allows the customer or operator to visually observe the entirety of the cooking operations.

It is yet a further object of the present invention to provide a staged rotisserie which is simple in its construction, economical to manufacture, and straight forward in use.

These and other objects, features and advantages of the present invention will become more apparent to those skilled in the art upon reading the following specification in conjunction with the accompanying drawing figures.

BRIEF DESCRIPTION OF THE DRAWING FIGURES

FIG. 2 is a top view of the interior of the staged rotisserie of FIG. 1.

DETAILED DESCRIPTION OF THE PREFERRED EMBODIMENT

Figure 1:
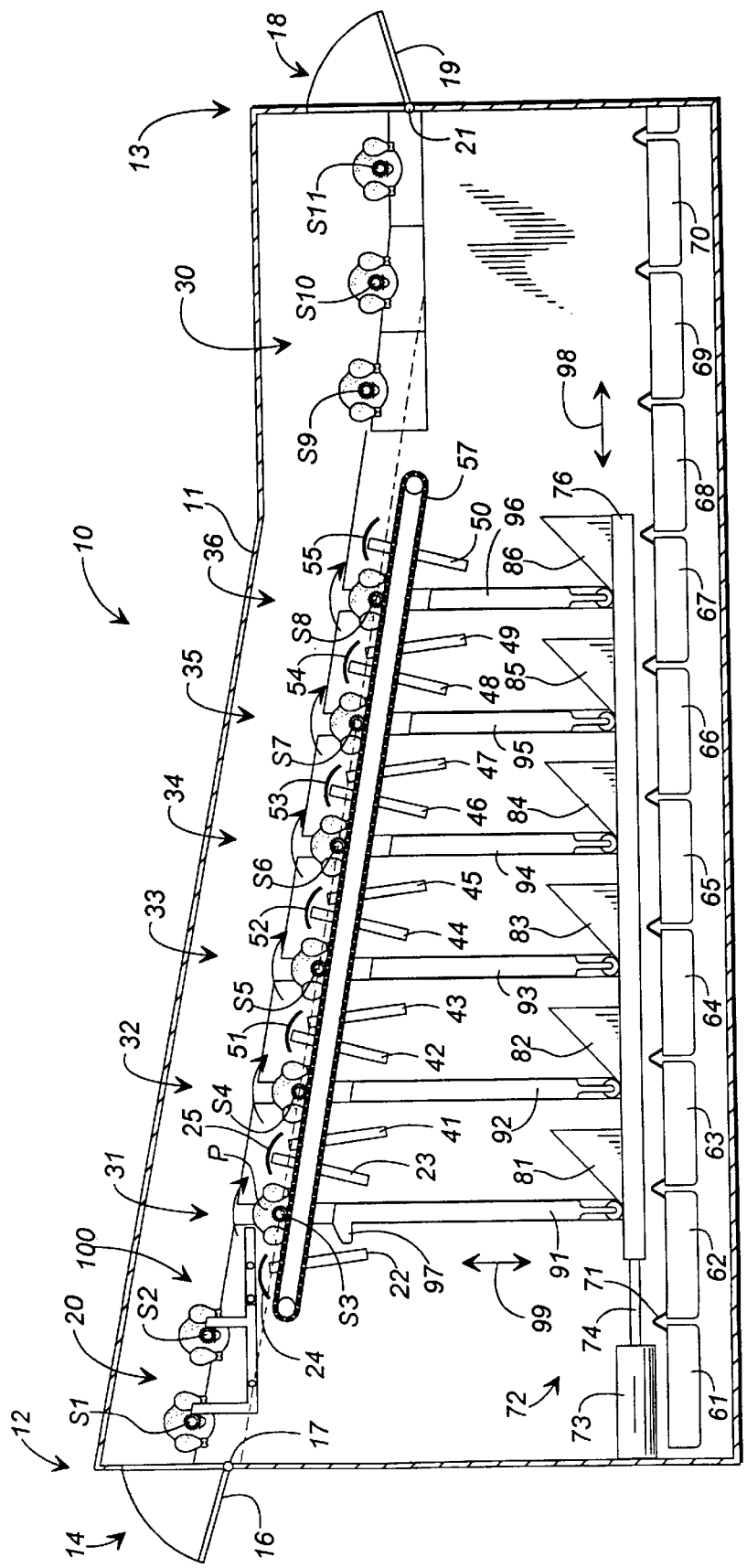
FIG. 1 is a schematic, side view of a staged rotisserie according to a preferred form of the invention.

Referring now in detail to the drawing figures, wherein like reference numerals represent like parts throughout the several views, FIG. 1 shows a staged rotisserie apparatus 10 according to a preferred form of the invention. The staged rotisserie apparatus 10 includes a housing 11 having an inlet end 12 and an outlet end 13 opposite thereto. The housing also includes an inlet 14 covered by an inlet door 16 generally adjacent the inlet end 12 of the housing. The inlet door 16 is pivotally mounted to the housing 11 at a hinge 17. In this way, the inlet door 16 can be moved between a lowered position for admitting spits manually through the door and a raised position for closing off the inlet end of the housing. Adjacent the outlet 13 of the housing 11, a similar outlet 18 is defined including an outlet door 19 pivotally mounted to the inlet end 13 of the housing 11 by a hinge 21.

The housing 11 is a compact unit that preferably includes unshown viewing windows in the sides and/or in the top for allowing an operator or a customer to view the cooking of poultry within the housing. While a totally enclosed housing with sides and a top is depicted in the drawings, in some instances it may be desirable to eliminate or remove one or more of the sides or the top to provide better visibility and improved access. It is pointed out that the invention has ready application in restaurants serving poultry and that it has additional application in factories preparing prepared (cooked) poultry.

Within the housing 11, the poultry are maintained on spits or skewers S and are moved from the inlet end 12 toward the outlet end 13. The housing contains mechanisms for heating the poultry in individual heating stations, for rotating the poultry in the heating stations by rotating the spits, and for advancing the spits containing the poultry from one station to the next in sequential fashion. The housing also includes an inlet staging area 20 for containing a queue of poultry spits waiting to be passed to a first cooking station or stage and a warming output station 30 where fully cooked poultry is held in a warm condition until it is retrieved through the outlet door 19.

Still referring to FIG. 1, it can be seen that the housing 11 contains six (6) discrete heating stages or stations for cooking poultry on spits. While six such discrete cooking stages or stations are depicted in the drawing figures, those skilled in the art will recognize that fewer or greater numbers of heating stages can be employed. Also, by making the cooking stages discrete from one another, they can be individually controlled to expose the poultry to different temperatures at different points during the cooking process. Each cooking station or stage can accommodate one spit S having one or more poultry P mounted thereon. For example, the first cooking stage 31 houses a spit S3 having mounted thereon poultry P. The other cooking stations 32–36 are similar. Each cooking station includes a pair of burners or heating elements, such as heating elements 22 and 23 associated with the first cooking station 31. Those skilled in the art will recognize that the cooking stations can include briquettes to provide even heating. The heating elements are positioned on either side of the poultry and face the poultry at a slight angle relative to vertical. In this way, the heating elements provide good heat against the sides and bottom of the poultry. As the poultry rotates, all of the surface of the poultry is heated evenly and effectively. The bottom of the heating elements are kept from beneath the poultry so that drippings do not fall onto the heating elements, thereby avoiding flame flare-ups within the rotisserie. Also, the tops of the heating elements are shrouded by covers, such as covers 24 and 25, to prevent drippings from falling onto the heating elements as the poultry and the spits are moved from one cooking station to a sequential cooking station. The other cooking stations 32–36 are similarly arranged with pairs of heating elements and covers for the heating elements (the covers may each cover two heating elements, as shown). Thus, the apparatus 10 includes heating elements 41–50 and covers 51–55.

As the individual spits S are held within the discrete heating stations or cooking stations 31–36, the spits are continuously rotated by an endless chain 57 driven by an unshown electric motor. The endless chain 57 engages sprockets mounted on the spits. In this way, as chain 57 is driven in rotation by the unshown motor, all of the spits resting atop the endless chain 57 are rotated accordingly.

In a lower portion of the housing 11, a series of drip pans 61–70 are arranged. Each of the drip pans extends across the width of the housing beneath the various cooking stations, the inlet staging area, and the outlet staging area. These drip pans collect drippings from the poultry to allow the drippings to be collected and removed. The drip pans are placed side-by-side and the space between the drip pans is protected by inverted V-shaped diverters, such as diverter 71.

A cam mechanism generally indicated at 72 is positioned above the drip pans 61–70 for raising and lowering the spits. The cam mechanism 72 includes a hydraulic or pneumatic cylinder 73 driving a pushrod 74 for pushing and pulling a cam bank 76. Mounted to the cam bank 76 are a series of identical cams 81–86.

Each of the cams 81–86 engages a cam roller mounted at the bottom end of a cam follower or lifter 91–96. Each of the lifters 91–96 has an upper end which engages one of the spits when the lifter is raised by operation of the cam block 76. The upper end or tip of the lifters 91–96 is slightly inclined to match the angle of incline of the endless chain 57. The upper end 97 of lifter 91 is different from the upper end of the other lifters and includes a portion residing beyond the guides and which is generally flag-shaped for cooperating with an inlet control mechanism for triggering the admission of one additional spit into the first cooking station. As shown in the figure, the lifters 91–96 are guided by guide surfaces such that back and forth motion of the cam block 76 (and therefore of the cams 81–86) in the lateral direction of direction arrow 98 is translated into simultaneous vertical up and down motion of the lifters 91–96 in the direction of direction arrow 99.

Figure 1A:
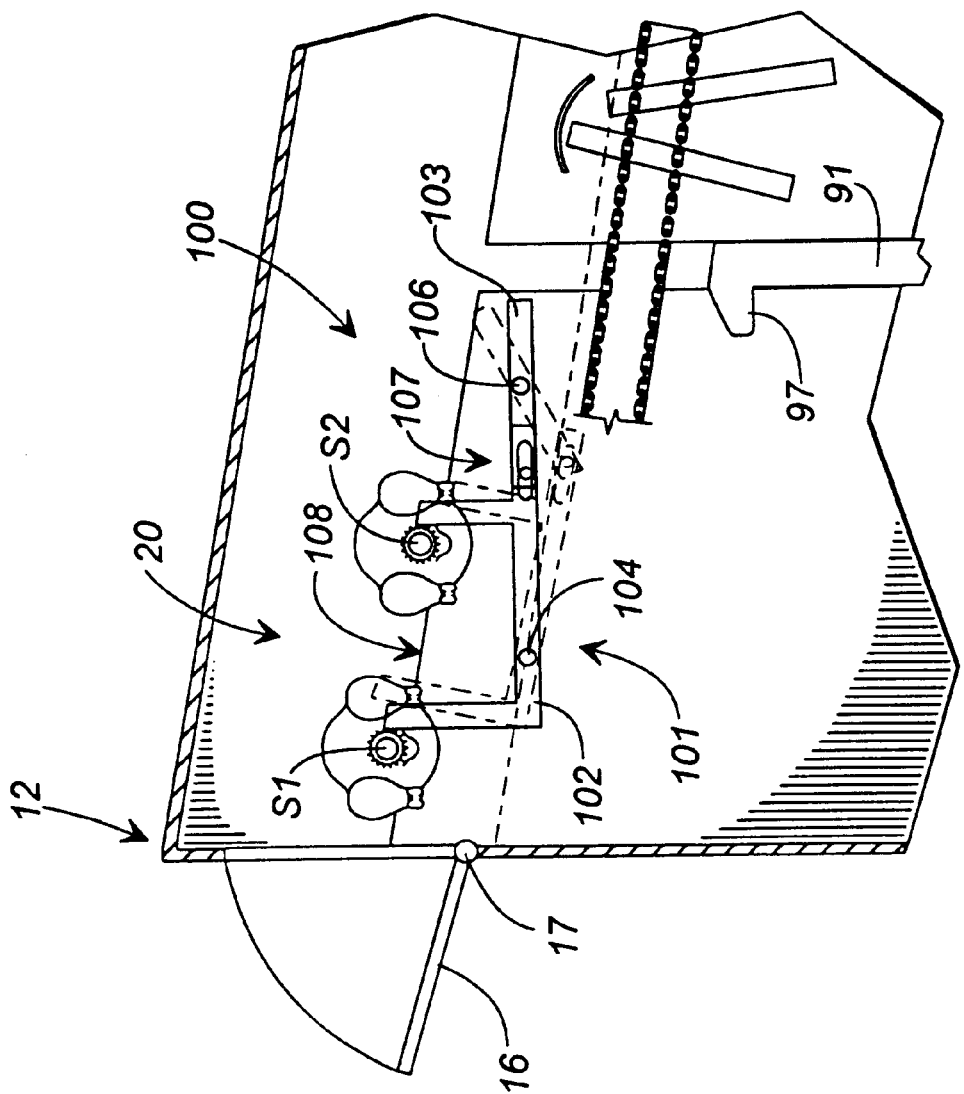
FIG. 1A is a detailed view of a portion of the staged rotisserie of FIG. 1.

Both FIG. 1 and FIG. 1A show the inlet control mechanism 100, with FIG. 1A showing it in more detail. As shown in FIG. 1A, the inlet control mechanism comprises a generally F-shaped linkage mechanism 101. The F-shaped linkage mechanism includes a short F-shaped link 102 and a pivot link 103. The F-shaped link 102 pivots about a pivot axle 104, while the pivot link 103 pivots about a pivot axle 106. Two links are coupled to each other by a pin and slot arrangement 107, with the slot being formed in the bottom leg portion of the F-shaped link 102, and the pin being attached to the end of pivot link 103. In this way, motion of the pivot link 103 from its blocking position (shown in solid line) to its admission position (shown in shadow line in FIG. 1A) causes the F-shaped link to pivot in a clockwise direction about pivot axle 104 to assume the position shown in shadow in FIG. 1A. Thus, the right-most tine of the F-shaped link 102 (as seen from the view in FIG. 1A) dips below the ramp surface 108 and allows a spit S2 to be admitted past the F-shaped link 102 and to roll or slide down the ramp 108 and fall into the slot of the first cooking station. While the right-most tine allows spit S2 to advance, the other tine of the F-shaped link 102 continues to hold spit SI in position. To allow spit SI to advance to the position of S2 in FIG. 1A, the F-shaped link is rotated in the opposite (counter-clockwise) direction by an unshown portion of the cam mechanism.

FIG. 2 shows the internal workings of the staged rotisserie of FIG. 1, shown from inside the housing and looking down from above. FIG. 2 shows the progression of spits having poultry mounted thereon from the inlet staging area 20 to the outlet staging area 30 in the direction of direction arrow 109. In particular, FIG. 2 shows the startup of cooking operations and shows a first spit S5 which has progressed about half-way through the staged rotisserie and is in the third cooking station. The first spit S5 is followed by second and third spits S4 and S3 that are in the second and first cooking stations, respectively. The next spit that would be introduced into the first cooking station would be the spit S2, currently held in the inlet staging area 20. That would be followed by the fifth spit S1 and so on. As the spits, such as spit S3–S5, are positioned and held in the individual discrete cooking stations, they are rotated continuously by operation of the endless chain 57.

To move the spits from one discrete cooking station to the next, the push rod 74 is retracted by the cylinder 73 to pull all of the cams 81–86 toward the cylinder 73. This has the effect of raising the individual lifters 91–96. The top surfaces of the lifters 91–96 engage the underside of the spits, thereby raising the spits with them. Once the spits have cleared the top surface of the inclined ramp 111 (see FIG. 1), they roll downwardly along the ramp 111 toward the next discrete cooking station. The cylinder 73 is then operated to extend the push rod 74, thereby lowering the lifters 91–96. Therefore, when each spit reaches the next cooking station, the spit drops into the slot between the guides and the sprockets on the spits once again are engaged by the endless chain 57. During this lifting of the spits, the flag-shaped end 97 of the first lifter 91 engages the pivot link 103 of the inlet control mechanism to trigger the inlet control mechanism to admit one more spit. This spit takes the place of the spit that has evacuated from the first cooking station.

In this way, the spits are held in a cooking station for a controlled length of time and then are advanced to a sequential next one of the cooking stations and sequenced through the discrete cooking stations from the inlet end toward the outlet end of the staged rotisserie.

Alternatively, rather than lifting the spits off of the endless drive chain 57, the endless drive chain 57 can be lifted by the lifters, thereby taking the spits upwardly as well. Once the spits breach the upper surface of the ramp, they all begin to roll downwardly down the ramp toward the next cooking station, whereupon the drive chain 57 is lowered once again by the cam mechanism.

While the invention has been shown in preferred forms, it will be apparent to those skilled in the art that many modifications, additions, and deletions can be made therein without departing from the spirit and scope of the invention as set forth in the following claims.

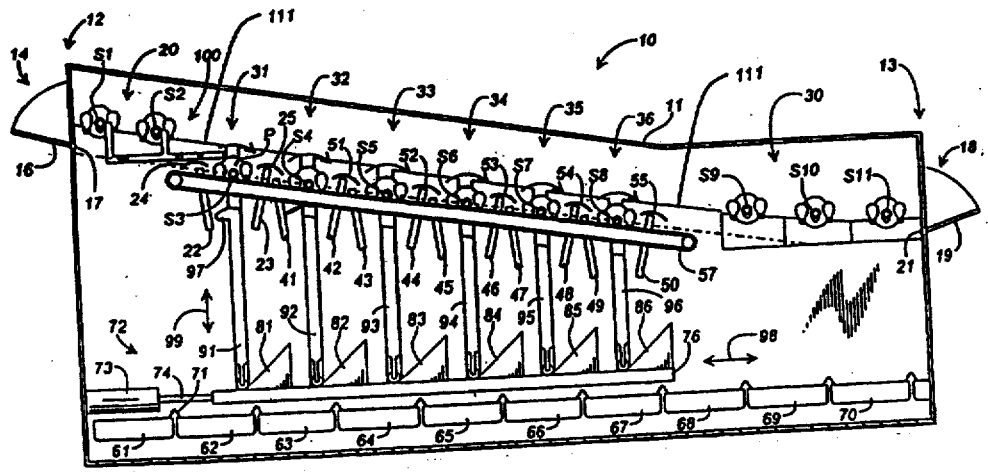

What is claimed is:

1. A staged rotisserie for continuous cooking of meat, such as poultry, comprising:
   a housing having an inlet and an outlet and having a plurality of discrete heating stations arranged sequentially from said inlet to said outlet;
   a plurality of spits for supporting meat products mounted thereon;
   support means for supporting said spits in said plurality of discrete heating stations;
   driving means for driving said spits in rotation; and
   advancement means for periodically advancing said spits from one of said discrete heating stations to a sequentially next one of said discrete heating stations, wherein said advancement means is operative to lift spits from an alternating lowered cooking position to a raised advancement position.

2. A staged rotisserie as claimed in claim 1 wherein as said advancement means operates to advance said spits from one discrete heating station to the next, said spits are continuously rotated by said driving means.

3. A staged rotisserie as claimed in claim 1 wherein said driving means comprises an endless drive chain driven continuously and engaging sprockets mounted on said spits.

4. A staged rotisserie as claimed in claim 1 further comprising inlet control means for controlling admission of spits through said inlet of said housing.

5. A staged rotisserie as claimed in claim 4 wherein said inlet control means is operative to admit a leading spit from a queue of spits adjacent said inlet.

6. A staged rotisserie as claimed in claim 4 wherein said inlet control means is activated by operation of said advancement means so that as said spits are advanced, another spit can be admitted through said inlet.

7. A staged rotisserie as claimed in claim 1 wherein progression of said spits through said plurality of discrete heating stations is generally in a descending direction.

8. A staged rotisserie as claimed in claim 7 wherein said spits descend by gravity to the next sequential discrete heating station.

9. A staged rotisserie as claimed in claim 7 wherein said advancement means comprises a plurality of lifters, each of said lifters being operative for lifting a spit, said advancement means further comprising a cam bar for raising and lowering said lifters.

10. A staged rotisserie as claimed in claim 9 further comprising guides positioned at each of said discrete heating stations to guide movement of said spits from said lowered cooking position to said raised advancement position.

11. A rotisserie for cooking poultry comprising:
a housing having an inlet end and an outlet end;
a plurality of poultry spits each for supporting at least one poultry thereon;
admission means for admitting spits having poultry mounted thereon into said housing;
advancement and driving means for advancing said spits through said housing in sequential fashion and for driving said spits in rotation within said housing, said advancement and driving means being operative to ensure that each spit resides within said housing for a pre-determined length of time; and
heating elements positioned within said housing for heating poultry supported on said spits, wherein said advancement means is operative to lift spits from an alternating lowered cooking position to a raised advancement position.

12. A rotisserie as claimed in claim 11 wherein said admission means comprises means for admitting one spit at a time.

13. A rotisserie as claimed in claim 11 wherein said admission means comprises a movable door.

14. A rotisserie as claimed in claim 11 wherein said housing has discrete heating stations and wherein said advancement and driving means is adapted for sequentially advancing said spits from one discrete heating station to the next through said housing.

15. A rotisserie as claimed in claim 14 wherein said spits descend by gravity to the next sequential discrete heating station.

16. A rotisserie as claimed in claim 14 wherein said advancement and driving means comprises a plurality of lifters, each of said lifters being operative for lifting a spit, said advancement and driving means further comprising a cam bar for raising and lowering said lifters.

17. A rotisserie as claimed in claim 16 further comprising guides positioned adjacent each of said discrete heating stations to guide movement of said spits from said lowered cooking position to said raised advancement position.

18. A rotisserie as claimed in claim 11 wherein said advancement and driving means is operative to trigger said admission means such that as spits are advanced from one discrete heating station to the next, said admission means is operated to admit one additional spit.

* * * * *

UNITED STATES PATENT AND TRADEMARK OFFICE
CERTIFICATE OF CORRECTION

PATENT NO.   : 6,202,545 B1                                   Page 1 of 2
DATED        : March 20, 2001
INVENTOR(S)  : James W. McConnell It is certified that error appears in the above-identified patent and that said Letters Patent is hereby corrected as shown below:

The title page, showing an illustrative figure, should be deleted and substitute therefore the attached title page.

Drawings,
Sheet 1, Fig. 1, the reference numeral 111 should be applied to the inclined ramp above the endless chain 57 and below the top of the housing 11, as shown below:

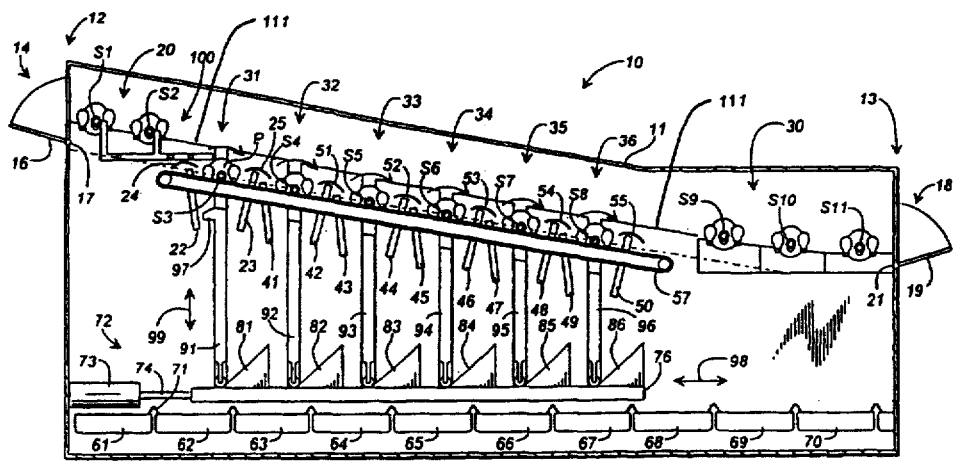

FIG. 1

Signed and Sealed this

Twenty-ninth Day of January, 2002

Attest:

Attesting Officer

JAMES E. ROGAN
Director of the United States Patent and Trademark Office

(12) United States Patent
McConnell

(10) Patent No.: US 6,202,545 B1
(45) Date of Patent: Mar. 20, 2001

(54) STAGED ROTISSERIE

(76) Inventor: James W. McConnell, 1240 NW. 55th St., Gainesville, FL (US) 32605

(*) Notice: Subject to any disclaimer, the term of this patent is extended or adjusted under 35 U.S.C. 154(b) by 0 days.

(21) Appl. No.: 09/432,837

(22) Filed: Nov. 1, 1999

Related U.S. Application Data

(63) Continuation of application No. 09/092,787, filed on Jun. 5, 1998, now Pat. No. 5,974,956.

(51) Int. Cl.[7] .................................................. A47J 37/04
(52) U.S. Cl. ........................ 99/421 H; 99/420; 99/433 R
(58) Field of Search ............................. 99/420, 421 H, 99/421 R, 443 R, 443 C; 426/523, 520

(56) References Cited

U.S. PATENT DOCUMENTS

| | | | |
|---|---|---|---|
| 1,996,297 | 4/1935 | Langenfeld | 99/419 |
| 2,138,813 | 12/1938 | Bemis | 99/420 |
| 2,142,390 | 1/1939 | Zerr | 99/420 |
| 2,520,067 | 8/1950 | Sagen | 99/420 |
| 2,556,808 | 6/1951 | Harris | 99/420 |
| 2,655,096 | 10/1953 | Ebin | 99/420 |
| 3,338,156 | 8/1967 | Angelos | 99/420 |
| 3,734,740 | 5/1973 | Zenos | 99/443 C |
| 3,747,510 | 7/1973 | Gladd et al. | 99/443 C |
| 3,848,523 | 11/1974 | Galisz et al. | 99/421 H |
| 4,034,661 | 7/1977 | Boosalis et al. | 99/420 X |
| 4,366,182 | 12/1982 | Kohler | 99/326 |
| 4,440,071 | 4/1984 | Boosalis | 99/339 |
| 4,644,857 | 2/1987 | Buller-Colthurst | 99/335 |
| 4,760,776 | 8/1988 | Beidler | 99/421 H |
| 4,882,985 | 11/1989 | Beller | 99/426 |
| 5,133,447 | 7/1992 | Florindez | 99/353 |
| 5,146,842 | 9/1992 | Romano | 99/421 V |
| 5,197,375 | 3/1993 | Rosenbrock et al. | 99/328 |
| 5,377,582 | 1/1995 | Nersesian | 99/420 |
| 5,460,080 | 10/1995 | Maru, Jr. | 99/420 |
| 5,471,915 | 12/1995 | Lopata | 99/421 H |
| 5,476,035 | 12/1995 | Florindez | 99/443 C |
| 5,542,345 | 8/1996 | Gongwer | 99/346 |
| 5,740,722 | 4/1998 | Emsens | 99/421 H X |

*Primary Examiner*—Reginald L. Alexander
(74) *Attorney, Agent, or Firm*—Garner Groff Mehrman & Josephic, P.C.

(57) ABSTRACT

A staged rotisserie for cooking poultry includes a housing having an inlet end and an outlet end and a plurality of discrete heating stations spaced within the housing between the inlet end and the outlet end. A plurality of poultry spits are moved through the housing, each spit supporting a poultry thereon. An admission mechanism is provided for controlling admission of spits into the housing. An advancement and driving mechanism advances the spits through the housing in sequential fashion and drives the spits in rotation within the housing, and is operative to ensure that each spit resides within the housing for a pre-determined length of time to ensure that the poultry is properly cooked, thereby avoiding undercooking and overcooking.

18 Claims, 3 Drawing Sheets